(12) United States Patent
Wallace et al.

(10) Patent No.: US 8,474,538 B2
(45) Date of Patent: Jul. 2, 2013

(54) HYDRAULICALLY ACTUATED SAFETY LOCK RING

(75) Inventors: David Andrew Wallace, Aberdeenshire (GB); Martin Urquhart, Aberdeenshire (GB)

(73) Assignee: Vetco Gray Inc., Houston, TX (US)

( * ) Notice: Subject to any disclaimer, the term of this patent is extended or adjusted under 35 U.S.C. 154(b) by 196 days.

(21) Appl. No.: 12/887,333

(22) Filed: Sep. 21, 2010

(65) Prior Publication Data
US 2012/0070225 A1 Mar. 22, 2012

(51) Int. Cl.
*E21B 17/01* (2006.01)

(52) U.S. Cl.
USPC ........... 166/350; 166/339; 166/341; 166/367; 285/81; 405/224.4

(58) Field of Classification Search
USPC ................ 166/350, 339, 341, 343, 351, 352, 166/367, 378–380; 285/81–86; 405/224.2–224.4
See application file for complete search history.

(56) References Cited

U.S. PATENT DOCUMENTS

| | | | | |
|---|---|---|---|---|
| 3,325,190 A * | 6/1967 | Eckert et al. | ..................... | 285/18 |
| 4,057,267 A * | 11/1977 | Jansen, Jr. | ....................... | 285/18 |
| 4,403,658 A * | 9/1983 | Watkins | ........................ | 166/355 |
| 4,502,543 A * | 3/1985 | Outhwaite | ..................... | 166/359 |
| 4,668,126 A * | 5/1987 | Burton | .......................... | 405/169 |
| 4,883,387 A * | 11/1989 | Myers et al. | ................ | 405/224.4 |
| 5,148,871 A * | 9/1992 | Gullion | ......................... | 166/345 |
| 5,310,007 A * | 5/1994 | Parikh | .......................... | 166/355 |
| 5,947,642 A * | 9/1999 | Teixeira et al. | ............ | 405/195.1 |
| 6,045,296 A * | 4/2000 | Otten et al. | ................. | 405/195.1 |
| 6,173,781 B1 * | 1/2001 | Milne et al. | ................... | 166/355 |
| 6,793,019 B2 * | 9/2004 | Rodgers et al. | ............... | 166/344 |
| 7,571,772 B2 * | 8/2009 | Reams | ......................... | 166/367 |
| 7,686,087 B2 * | 3/2010 | Pallini et al. | .................. | 166/367 |
| 8,021,081 B2 * | 9/2011 | Crotwell et al. | ........... | 405/223.1 |
| 8,096,540 B2 * | 1/2012 | Claxton | ........................ | 269/188 |
| 2012/0168172 A1 * | 7/2012 | Litherland et al. | ............ | 166/367 |

* cited by examiner

*Primary Examiner* — Matthew Buck
(74) *Attorney, Agent, or Firm* — Bracewell & Giuliani LLP

(57) ABSTRACT

A connector assembly that can be used to connect a tension ring to a telescoping joint on a riser by using a lower set of hydraulically actuated dogs. A set of hydraulically actuated hang-off dogs on the connector assembly can be used to connect the tension ring to a diverter housing mounted on a rig. To prevent accidental disengagement of the hang-off dogs, a hydraulically actuated lock ring is used to provide a positive stop against the back of the hang-off dogs.

11 Claims, 5 Drawing Sheets

HYDRAULICALLY ACTUATED SAFETY LOCK RING

FIELD OF INVENTION

This invention relates in general to tension rings and in particular to a safety lock ring for a tension ring that is hydraulically actuated.

BACKGROUND OF THE INVENTION

Locking mechanisms for oilfield equipment often include a device called a hang-off dog. The dog is put into a locking position between two components, such as a tension ring and a diverter housing, to hold a position or take a load. For example, the hang-off dog can be part of a tension ring that can maintain a riser in stable tension when offshore platforms heave. A telescoping joint or slip joint is typically connected to the riser to allow compensating for such heaves. The telescoping joint is also typically locked to the tension ring via dogs or pins on the tension ring that mate with a groove on the telescoping join. When the riser is retrieved during routine operation or emergency situations, the hang-off dog can be actuated to engage a diverter support housing connected to the rig, thus preventing the riser from falling and injuring personnel. The hang-off dogs can be manually or hydraulically actuated to engage the diverter support housing.

To prevent the accidental unlocking of the hang-off dogs, a manual lockout or positive stop can be employed to secure the hang-off dog in a locked position. When the lockout is engaged, the hang-off dog is locked in an engaged position. When the lockout is disengaged, the hang-off dog is free to move between an engaged and a disengaged position. One method of providing a positive stop for hang-off dogs includes using a metal gate that requires a person to physically flip the gate over behind the hang-off dogs. This requires sufficient clearance above the tension ring to allow the gate to flip over. When the gate is flipped back over in the opposite direction to allow the hang off dogs to retract, the gate rests on top of tension ring which could then prevent movement of tension ring during normal operation. Further, this method requires that each hang off dog have an individual, hydraulically actuated gate. The method is costly due to the individual gates and the extra machining to provide flats on which to mount the hydraulic gates.

A need exists for a technique to provide a cost-effective, positive stop for the hang-off dogs on the tension ring to prevent the accidental retraction of hang-off dogs. Further, the positive stop technique should require minimal space in which to operate. The following technique may solve these problems.

SUMMARY OF THE INVENTION

In an embodiment of the present technique, a locking mechanism for a riser tension ring comprises a riser tension ring that is coupled to a telescoping joint. The tension ring can have eyelets disposed circumferentially around its exterior and adapted to receive wires that attach to the structure of a rig. The ring can be adapted to maintain tension on a drilling riser comprised of several thousand feet of pipe and extends from a rig down to the seafloor. The tension is applied to the riser via the wires attached to the ring to thereby prevent the riser from collapsing. The tension ring can apply tension to the riser through a housing connected to a slip joint.

When the riser tension ring is hung off from a member, such as a diverter support housing, hang-off dogs on the tension ring are extended through the body of the tension ring to mate with a groove or mating hole on the housing. To prevent accidental retraction of the hang-off dogs, a safety lock ring is included on an outer surface of the riser tension ring. A hydraulic piston is mounted on the riser tension ring to actuate the safety lock ring between a locked and unlocked position. In this embodiment, a hydraulic source applies hydraulic fluid under pressure to the piston, which is mounted at one end to the lock ring and at other end to the main body of the tension ring.

The lock ring is mounted onto the main body of the tension ring with fasteners that go through Teflon blocks and into the main body of tension ring. This arrangement allows retaining of the lock ring while also providing a low friction surface, like the Teflon blocks, for the lock ring to rotatably slide over when actuated. The lock ring provides a positive stop to hang-off dogs on the tension ring that engage a member, such as a diverter support housing, to hold the load of the riser. When the lock ring is in the lock position, rotated to form a stop on the back of the extended hang-off dogs, it advantageously prevents accidental retraction of the hang-off dogs. Further, the lock ring also advantageously eliminates the need for human personnel in the vicinity of the lock ring because the lock ring can be controlled from a safe, remote area with a hydraulic control panel like that already used to control other functions of a tension ring.

DETAILED DESCRIPTION OF THE INVENTION

Figure 1:
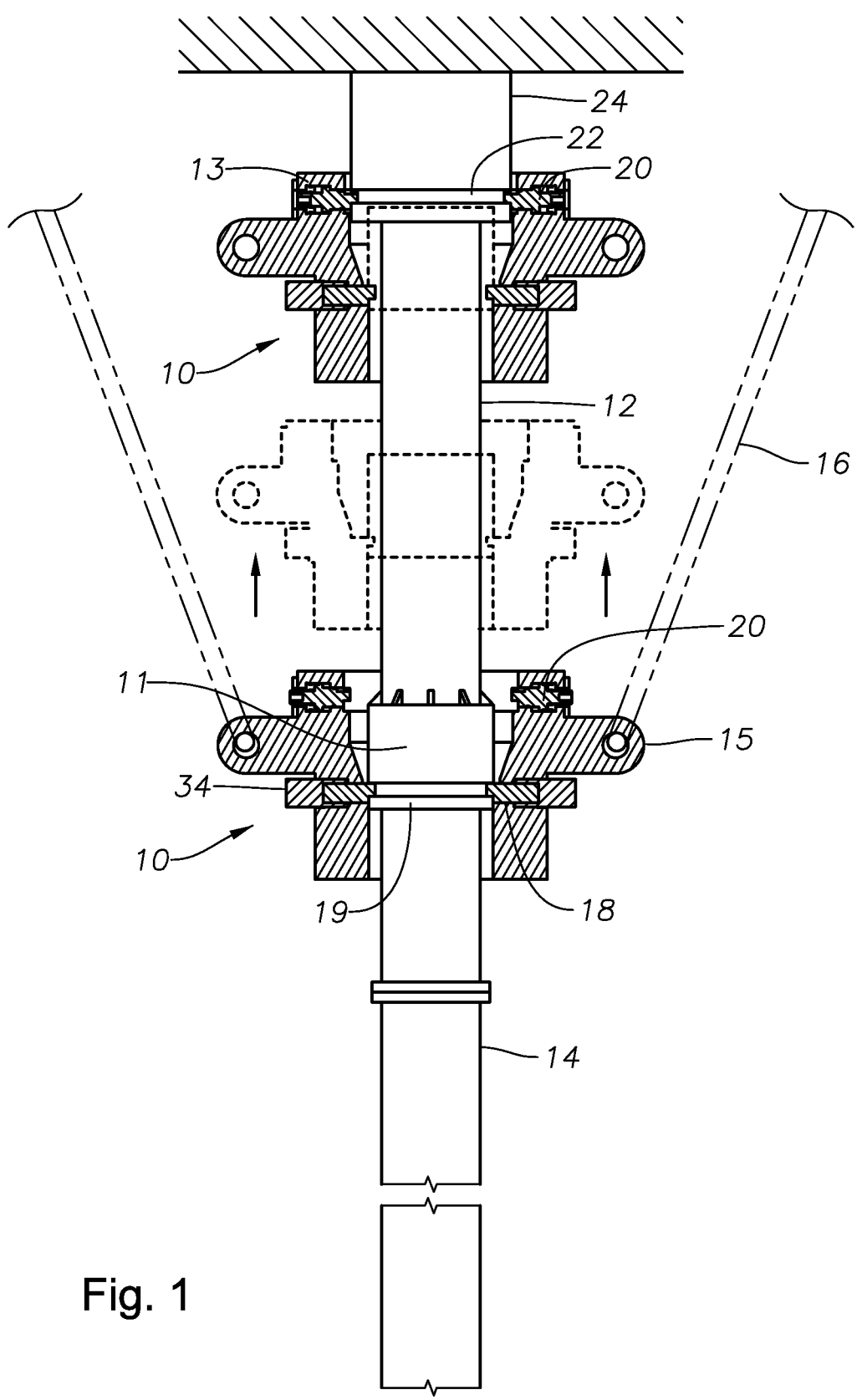
FIG. 1 is a side partial sectional view of a tension ring in contact with a housing and lower dogs engaged to the telescoping joint, in accordance with an embodiment of the invention.

Referring to FIG. 1, an embodiment of the invention shows in a side sectional view a tension ring or connector assembly 10 for connecting two members. One member can be, for example, an outer member such as the riser tensioner ring 10 itself and the other member can be, for example, an inner member such as a housing 11 on a telescoping or slip joint 12 connected to a riser 14. The tensioner ring 10 is typically in a lower position when applying tension to the riser 14 and may be raised upward towards a structure, such as a diverter housing 24, for storage.

In this example, the tension ring 10 may have a central main body 13 and can have eyelets 15 disposed circumferentially around the exterior of an upper ring housing 17 (FIG. 2) that partially surrounds the main body 13. The eyelets 15 are adapted to receive wires 16 that attach to a tension system (not shown) that maintains constant tension and the central main body 13 may rotate with respect to the riser 14. The tension ring 10 can be adapted to maintain tension on a drilling riser 14 comprised of several thousand feet of pipe that extends from a rig down to the seafloor. The tension is applied to the riser 14 via the wires 16 attached to the ring 10 to thereby prevent the riser 14 from collapsing, and can be applied to the riser 14 through the housing 11. The telescoping joint 12 typically comprises two concentric barrels (not shown) that slide axially relative to each other to compensate for heaves of the platform. In this embodiment, the tension ring 10 connects to the housing 11 of the telescoping joint 12 via dogs 18 that engage a mating groove 19 on the housing 11. When needed, the riser 14 and tension ring 10 are raised upwards onto the rig by, for example, a derrick. Hang-off dogs 20 carried on an upper end of the tension ring 10 are extended to mate with a groove 22 formed on a diverter support housing 24 connected to the rig. The wires 16 may be pulled through the eyelets 15 and removed once the tension ring 10 is secured to the diverter support housing 24. In this example, twelve hang-off dogs 20 carried within a the central main body 13 of the tension ring 10, are used to engage the support housing 24, although more or less dogs may be used.

Figure 2:
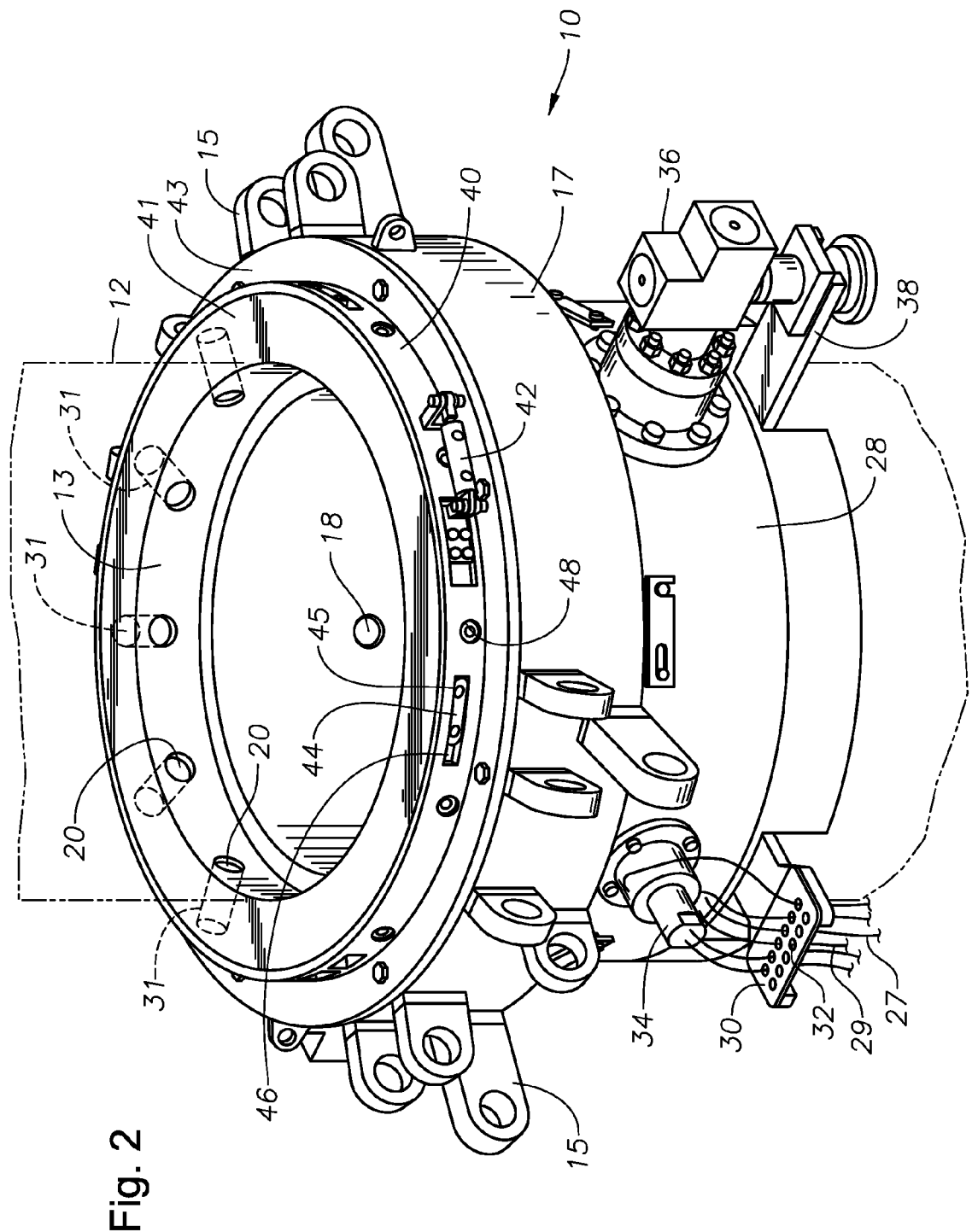
FIG. 2 is a side perspective view of the hang-off dogs and lock ring on a tensioner ring in a retracted position, in accordance with an embodiment of the invention.
Figure 3:
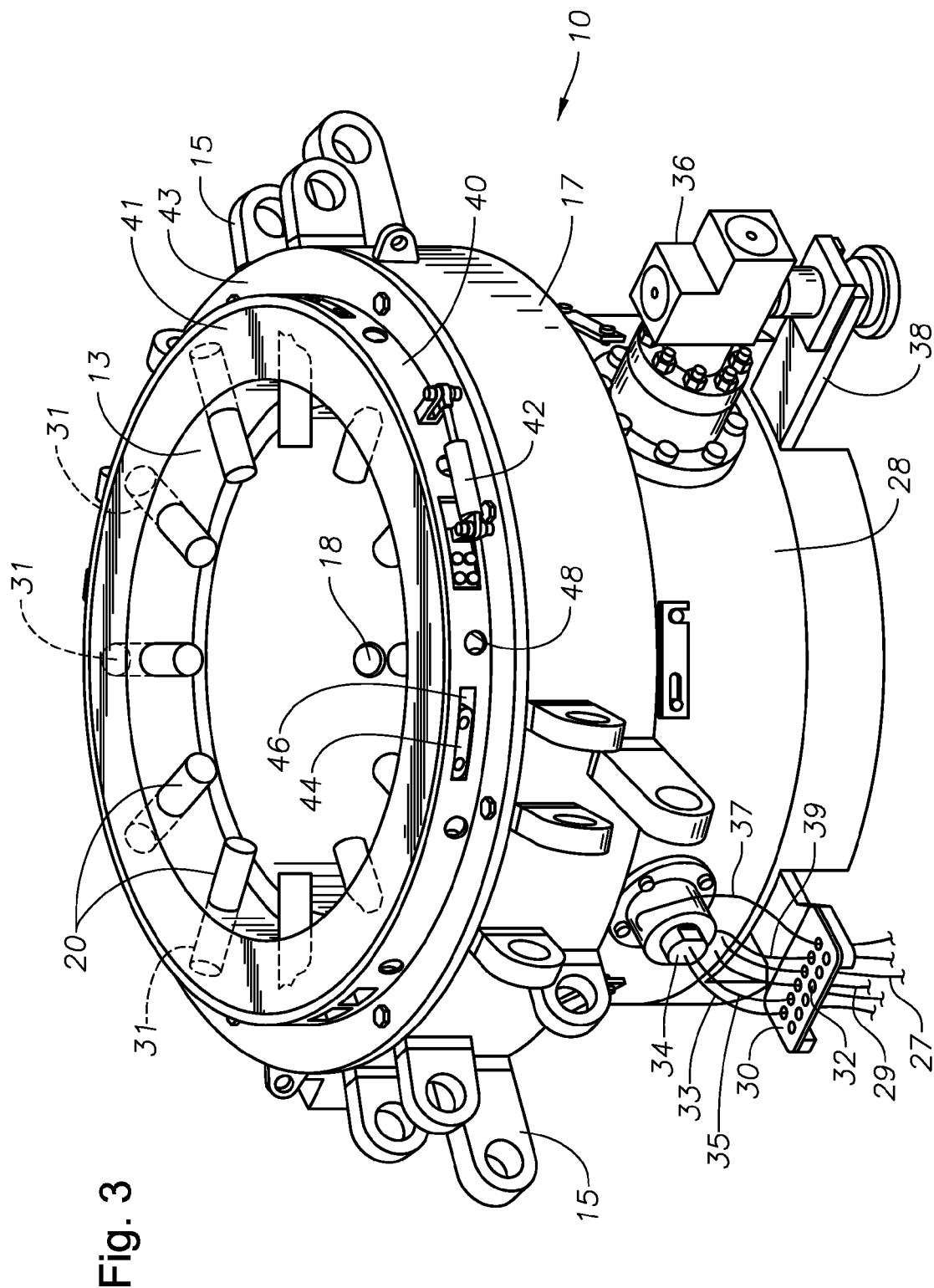
FIG. 3 is a side perspective view of hang-off dogs and lock ring on a tensioner ring in an extended position, in accordance with an embodiment of the invention.

Referring to FIGS. 2 and 3, in this embodiment, a perspective view of the tension ring 10 is shown isolated for clarity. The tension ring 10 can comprise a frame or main body 13 that can rotate with respect to the riser 14. The tension ring 10 has a lower ring housing 28 that is recessed radially inward from the upper ring housing 17 on which the eyelets 15 are disposed. A support plate 30 with openings 32 for receiving tubing may extend radially outward through a cutaway in the lower ring housing 28. The tubing openings 32 may secure tubing used to perform various types of functions. For example, hydraulic lines 27, 29 may be set on the support plate 30 and may enter the tension ring 10 where each of the lines 27, 29 may communicate with channels (not shown) formed within the lower ring housing 28 of the main body 13. The channels (not shown) may run upwards from the point of entry to communicate with fluid cylinders or passages 31 (shown dashed), which carry the hang-off dogs 20. By applying hydraulic pressure via lines 27, 29 to the fluid passage 31, the hang-off dogs 20 may be actuated to extend or retract.

FIGS. 2 and 3 also show pneumatic tubing 33 and hydraulic tubing 35 that may be carried by the support plate 30 and may enter the tension ring 10 to serve a packer in the riser 14 (not shown). The support plate 30 also may carry hydraulic tubing 37, 39 for actuating a piston 34. The piston 34 protrudes radially outward from the lower ring housing 28. The piston 34 hydraulically actuates the dogs 18 radially inward to mate with the groove 19 formed on the housing 11 of the telescoping joint 12 (FIG. 1). Additional tubing may also be used to perform additional tension ring 10 operations.

Further illustrated in FIGS. 2 and 3, is a riser auxiliary termination 36 for choke and kill lines shown set on a support plate 38 that protrudes radially outward from the lower ring housing 28. The riser auxiliary termination 36 allows control lines to reach a blowout preventer (not shown). Blowout preventers may be controlled and actuated hydraulically and are typically installed at a wellhead to prevent blowouts in a well. As such, the auxiliary termination 36 allows these lines to extend downward in a riser to serve the blowout preventer.

In this embodiment, the central main body 13 has an upward-facing rim 41. A safety lock ring 40 is mounted onto the central main body 13 of the tension ring 10 so that it circumscribes the rim 41 and a top portion of the lock ring 40 is flush with the rim 41, in this example. The safety lock ring 40 is in close reception with the rim 41 and has limited rotation around the rim 41. In this example, the lock ring 40 does not come into contact with an upward facing shoulder 43 defined by the upper ring housing 17 and the rim 41, which is inwardly recessed relative to the upper ring housing 17. The safety lock ring 40 may be mounted to the main body 13 with elongate blocks 44 that are fastened to the rim 41 on the main body 13 by fasteners 45, such as screws. The blocks 44 may be made from a material having a low coefficient of friction such as Teflon®. In this embodiment, four blocks 44 are spaced equidistant from each other around the rim 41. The blocks 44 are allowed to slide within a channel 46 formed on the lock ring 40. This arrangement allows retaining of the lock ring 40 while also providing a low friction surface, like the blocks 44, for the lock ring to rotatably slide over when actuated. The length of the channel 46 also limits the amount that the lock ring 40 rotates.

A hydraulic piston 42 is mounted on the riser tension ring 10 for rotatably actuating the safety lock ring 40 between a locked and unlocked position. In FIG. 2, the hang-off dogs 20 and lock ring 40 are shown in the retracted position, with a dog opening 48 formed on the lock ring 40 allowing for the hang-off dogs 20 to retract. In FIG. 3, the dogs 20 are extended such that they protrude radially inward to engage the groove 24 of the diverter support housing 24 (FIG. 1). Further, the lock ring 40 is shown rotatably actuated to the extended position such that the dog openings 48 are misaligned with a back end of the hang-off dogs 20 to thereby provide a positive stop that prevents the hang-off dogs 20 from being retracted.

Figure 4:
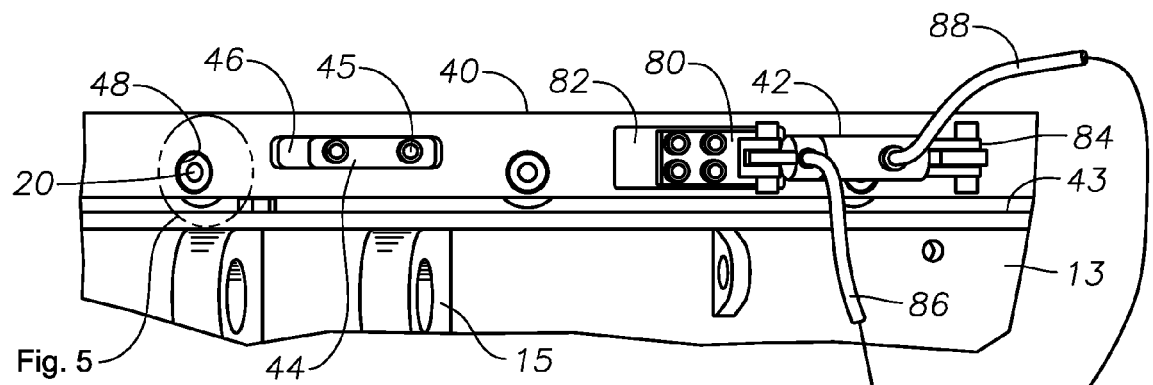
FIG. 4 is a side view of hang-off dogs and lock ring on a tensioner ring in a retracted position, in accordance with an embodiment of the invention.
Figure 5:
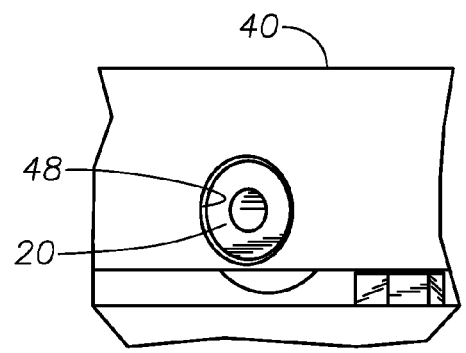
FIG. 5 is an enlarged perspective view of the hang-off dogs and lock ring on a tensioner ring in the extended position, in accordance with an embodiment of the invention.
Figure 6:
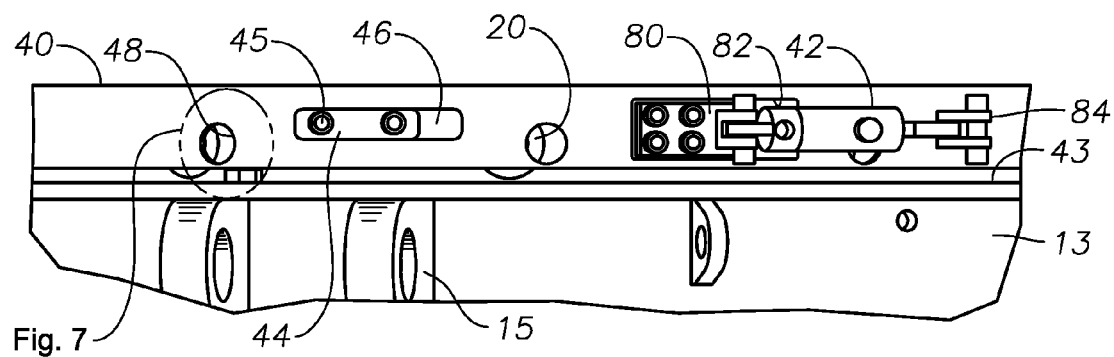
FIG. 6 is an enlarged view of the locked hang-off dogs, in accordance with an embodiment of the invention.
Figure 7:
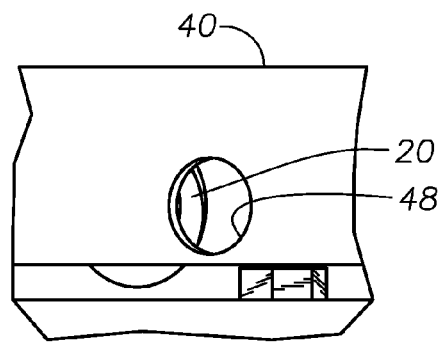
FIG. 7 is an enlarged perspective view of the locked hang-off dogs, in accordance with an embodiment of the invention.

Referring to FIGS. 4-7, the piston 42 and block 44 arrangement is shown enlarged and in additional detail for clarity. FIGS. 4 and 5 illustrate the lock ring 40 in the retracted, unlocked position to allow the hang-off dogs 20 to be retracted. FIGS. 6 and 7 illustrate the lock ring 40 in the locked position to prevent the hang-off dogs 20 from being accidentally retracted.

In FIG. 4, a front view of the hydraulic piston 42 illustrates a mounting bracket 80 connected to the rim 41 of the main body 13 through a bracket opening formed on the lock ring 40. Another mounting bracket 84 is connected to the lock ring 40 itself. The hydraulic piston 42 may be a double-acting type that is served by hydraulic lines 86, 88 at both ends. When the hang-off dogs 20 have been actuated to extend as shown in FIG. 3 to engage the diverter support housing 24, a hydraulic source 50 with a control valve 52 may provide hydraulic fluid under pressure via hydraulic line 88 to the piston 42 to rotate the lock ring 40. This misaligns the dog openings 48 with the back of the hang-off dogs 20, creating a stop for the hang-off dogs 20 (FIGS. 6 and 7). When desired, hydraulic fluid may be provided via the opposing hydraulic line 86 to rotatably actuate the lock ring 40 to a retracted position such that the dog opening 48 align with the hang-off dogs 20 may be retracted through the dog opening 48 on the lock ring 40, as shown in FIGS. 4 and 5. The hydraulically actuated lock ring 40 assembly on the tension ring 10 thus prevents accidental retraction of the hang-off dogs 20 without the need for human personnel, resulting in increased safety.

While the invention has been shown in only one of its forms, it should be apparent to those skilled in the art that it is not so limited but is susceptible to various changes without departing from the scope of the invention.

What is claimed is:
1. A riser tension ring assembly, comprising:
   a tubular body;
   hydraulic fluid passages formed radially through the body, each of the passages intersecting an outer circumference portion of the body;

a plurality of dogs, each of the dogs being carried within one of the passages, the dogs being selectively moveable within the passages between extend and retract positions in response to hydraulic fluid pressure applied to the passages;

a lock ring circumscribing the outer circumference portion of the body and selectively rotatable from a non-locking position to a locking position;

openings formed in the lock ring that register with the passages when the lock ring is in the non-locking position to enable a back of each of the dogs to move into one of the openings while in the retract position, the openings being angularly offset from the passages when the lock ring is in the locking position thereby forming a backstop for the dogs to prevent the dogs from retracting while the lock ring is in the locking position; and wherein the lock ring is rotatable from the non-locking to the locking position only when the dogs are in the extend position.

2. The assembly according to claim 1, further comprising a riser auxiliary termination for terminating choke and kill lines, the auxiliary termination protruding radially outward from a lower housing of the tubular body.

3. A riser tension ring assembly, comprising:
a tubular body;
passages formed radially through the body;
dogs selectively moveable through the passages; and
a lock ring circumscribing the body and selectively rotatable from a non-locking position to a locking position;
openings formed through the lock ring that register with the passages when the lock ring is in the non-locking position and are angularly offset from the passages when the lock ring is in the locking position thereby forming a backstop for the dogs where the passages intersect an outer circumference of the body; and
wherein the lock ring is mounted to a rim formed on the tubular body by a low-friction block fastened to the rim, the block slidingly engaging a channel formed on the lock ring.

4. The assembly according to claim 3, where in the low friction block is made of Teflon®.

5. The assembly according to claim 3, further comprising a hydraulic piston mounted at one end to the rim of the body and at another end to the lock ring, the hydraulic piston extending in response to hydraulic pressure to rotatably actuate the lock ring.

6. A method of engaging and disengaging a riser tension ring assembly, comprising:
providing a tubular body;
forming hydraulic fluid passages radially through the body, each of the hydraulic fluid passages intersecting an outer circumference portion of the body;
locating a dog within each of the passages, the dogs being selectively moveable between retract and extend positions in response to hydraulic fluid pressure applied to the passages;
mounting a lock ring on the body, wherein the lock ring circumscribes the outer circumference portion of the body, the lock ring having a plurality of openings therein;
to disengage the riser tension ring assembly, rotating the lock ring to a non-locking position while the dogs are in the extend position, wherein the openings register with the passages; then
applying hydraulic fluid pressure to the passages to cause the dogs to move to the retract position and a back of each of the dogs to enter one of the openings;
to engage the riser tension assembly, applying hydraulic fluid pressure to the passages to cause the dogs to move to the extend position while the lock ring is in the non-locking position; then;
rotating the lock ring from the non-locking position to a locking position thereby misaligning the openings with the passages and preventing the dogs from moving back to the retract position.

7. The method according to claim 6, where in the step of mounting a lock ring on the body further comprises the steps of:
providing a low-friction block;
fastening the block to the outer circumference portion of the body;
mounting the lock ring to the outer circumference portion with the low-friction block, the block slidingly engaging a channel formed on the lock ring.

8. The method according to claim 7, further comprising selecting a low friction block made of Teflon®.

9. The method according to claim 6, further comprising the step of providing and mounting a hydraulic piston to one end of the outer circumference portion of the body and at another end to the lock ring, the hydraulic piston extending in response to hydraulic pressure to rotatably actuate the lock ring.

10. The method according to claim 6, further comprising the step of mounting a riser auxiliary termination for terminating choke and kill lines, the auxiliary termination protruding radially outward from a lower housing of the tubular body.

11. The mended according to claim 6, wherein engaging the riser tensioner assembly further comprises the step of aligning the dogs in the passages with a housing positioned inside the riser tension ring assembly, and engaging the dogs with the housing while in the extend position.

* * * * *